Jan. 26, 1960 — A. A. E. HANSEN — 2,922,669
INDEXABLE JOINT
Filed Feb. 27, 1957 — 2 Sheets-Sheet 1
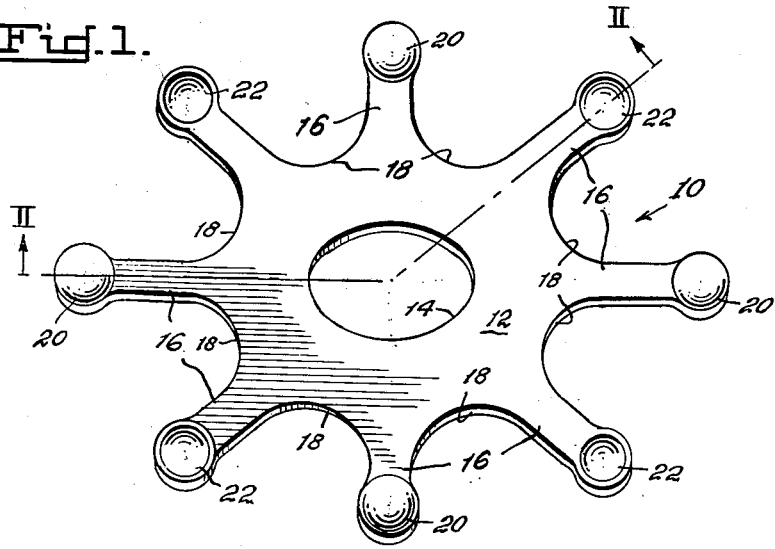
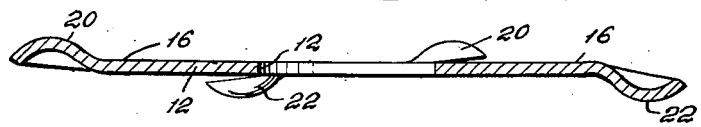
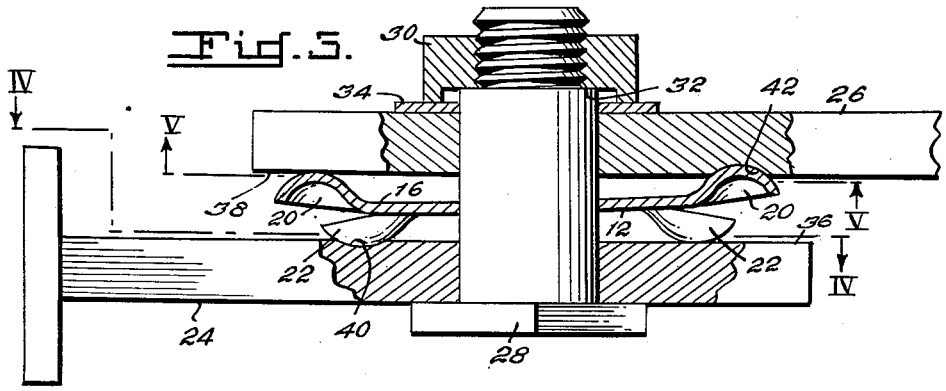
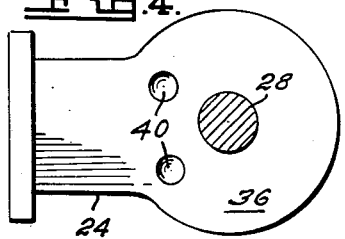
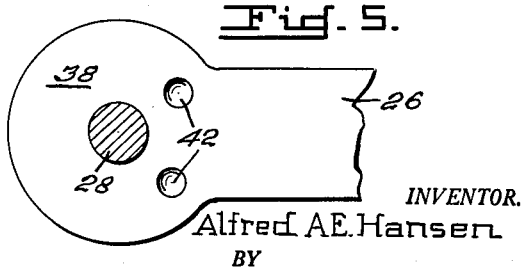
INVENTOR.
Alfred A.E. Hansen
BY
W. E. Thibodeau, T. J. Lynch & R. M. Lyon

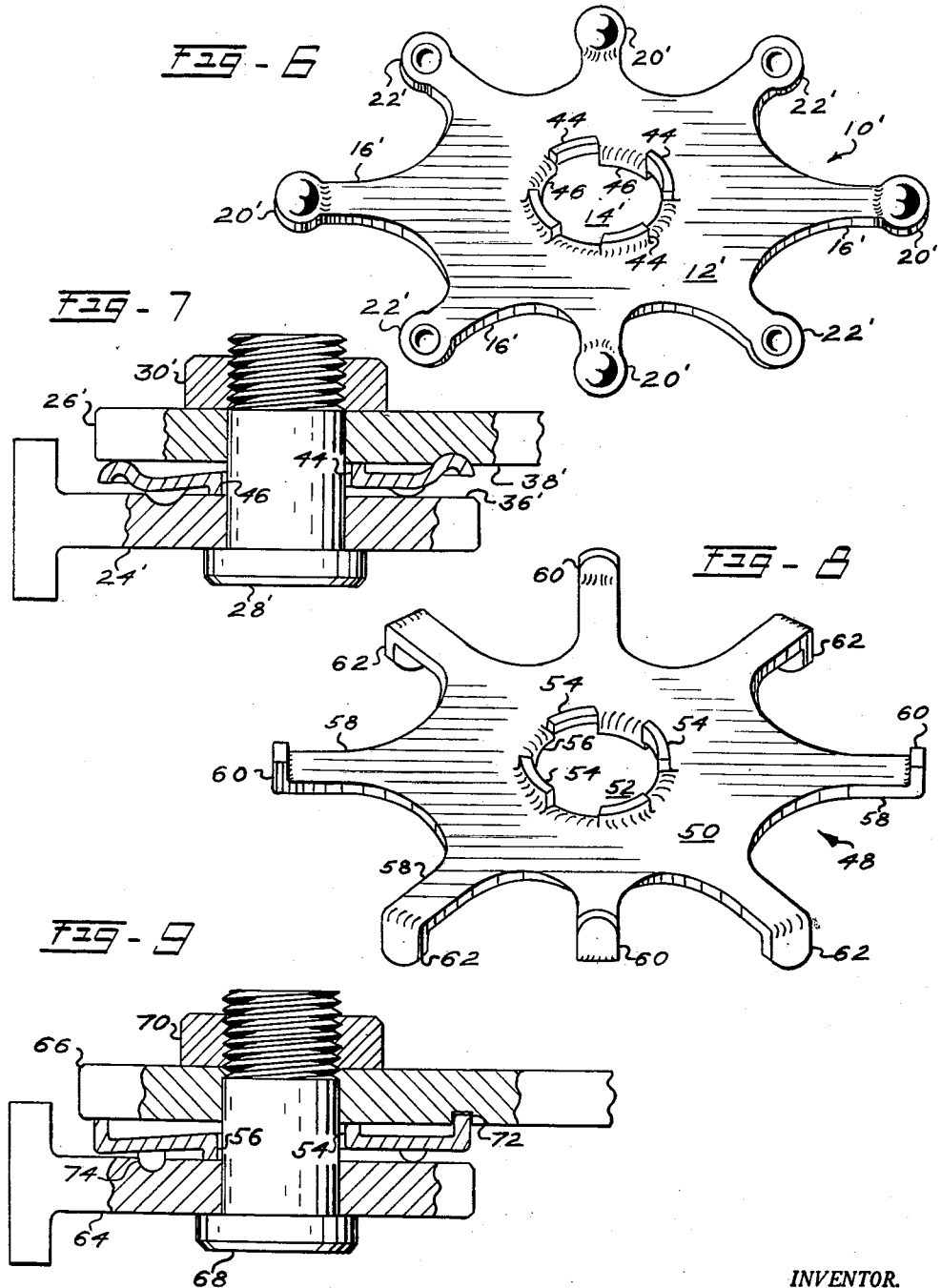

United States Patent Office 2,922,669
Patented Jan. 26, 1960

2,922,669

INDEXABLE JOINT

Alfred A. E. Hansen, Highland Park, Mich.

Application February 27, 1957, Serial No. 642,917

4 Claims. (Cl. 287—14)

(Granted under Title 35, U.S. Code (1952), sec. 266)

The invention described herein may be manufactured and used by or for the Government for governmental purposes without the payment to me of any royalty thereon.

The invention relates to indexable joints, particularly those of the type which utilize a spring washer.

It is often desirable to be able to adjustably position one member in relation to another, yet provide an easy and quick change of adjustment, examples of such devices may be found on lamp brackets, fan bases, mirror holders and any other type of application wherein an adjustable angular connection between a stationary bracket and movable support is desired. The indexable joint is a common construction of this type wherein a pivot pin is used to hold the bracket and support together, yet permitting angular adjustment.

Several means have been used to adjust and hold the support relative to the bracket and have included the use of studs and wing nuts, toothed rings and lock washers or nuts, however the best results have been obtained with spring washers which are resilient and are used to create friction between the stationary and movable members, although difficulty is experienced in maintaining the proper tension on most spring washers as the washers lose resiliency and the setting of the nuts and studs used to maintain the spacing often changes due to the relative rotation of the members.

It is thus an object of the invention to design an indexable joint which will operate effectively through a relative wide range of tensions, minimizing a need for fine spacing adjustment, and will also retain a positive indexing function irrespective of the number of times the joint may be adjusted, assembled or disassembled.

Another object of the invention is to produce an indexable joint which uses a spring washer which will co-operate with positioning means carried by the mounting members to maintain the mounting members in a predetermined position, yet will not cut or scrape the members.

Yet another object of the invention is to design an indexable joint which utilizes a spring washer having resilient indexing members and means for maintaining the spacing of the elements of the joint preventing excessive pressure upon the resilient members of the washer.

These and other objects of the invention will become apparent when viewed with respect to the accompanying specifications and drawings wherein:

Fig. 1 is a perspective view of the spring washer used in the invention.

Fig. 2 is a cross-section elevational view of the spring washer taken along the line II—II of Fig. 1.

Fig. 3 is a cross-sectional elevation view of the assembled indexable joint of the invention.

Fig. 4 is a cross-sectional plan view taken along the line IV—IV of Fig. 3.

Fig. 5 is a cross-section inverted plan view taken along the line V—V of Fig. 3.

Fig. 6 is a perspective view of a modification of the spring washer shown in Fig. 1.

Fig. 7 is a cross-sectional view of an assembled indexable joint using the washer shown in Fig. 6.

Fig. 8 is another modification of a spring washer used with an indexable joint of the invention.

Fig. 9 is a cross-sectional view of an assembled joint using the washer of Fig. 8.

The spring washer 10 comprises the basic element of the indexable joint and is preferably composed of a single piece of resilient sheet material such as spring steel, however any material may be used which has sufficient resilient characteristics to meet the particular application in which the joint is used.

Washer 10 is composed of a body 12 which is provided with a hole 14. A plurality of arms or prongs 16 extend radially from body 12 and are spaced equally about the periphery thereof. As will be noted from Fig. 1, the prongs 16 are connected by an arcuate edge 18 so as to eliminate sharp corners and maximum stress points.

The ends of prongs 16 are shaped to deflect from the plane of body 12 and to form detents in that the tips are indented to alternately present a bulbous portion extending above and below the plane of the washer body 12. Thus, viewing washer 10 from above as in Fig. 1, half of the tips of prongs 16 will be shaped convexly as at 20, while alternate tips will be formed concave as at 22.

The assembled joint is shown in Fig. 3, wherein a fixed bracket 24 is adapted to adjustably carry a support arm 26. By way of example, arm 26 may carry a light, mirror or other such item which is usually adjustably mounted. Bracket 24 and arm 26 are clamped together by a bolt 28 and nut 30. Bolt 28 is provided with a shoulder 32 to prevent excessive tightening and maintain proper spacing while a washer 34 is inserted between the nut 30 and arm 26 to reduce wear.

The opposing surfaces 36 and 38 of bracket 24 and arm 26 respectively are planar and each are provided with several recesses 40 and 42. The spring washer 10 is located between bracket 24 and arm 26, as shown, with the bolt 28 extending through hole 14. The spacing between surfaces 36 and 38 is such that the prongs 16 will be bent slightly toward the plane of body 12 insuring firm contact of the convex portions 20 with arm 26 and concave portions 22 with bracket 24.

The recesses 40 and 42 are located the same distance from the axis of bolt 28 as the bulbous portions 20 and 22 and are shaped to conform to said portions, thus washer 10 may be adjusted such that at least one of the portions 22 will engage a recess 40 and by slightly rotating arm 26, a recess 42 will line up with a portion 20. Preferably, several recesses are formed in both the arm 26 and bracket 24; two recesses are shown in Figs. 4 and 5, however, any number may be used, so as to provide a wide selection of indexable positions. In applications wherein it is desirable that the force required to index arm 26 be greater than can be provided by one recess 40 and one recess 42 being engaged by portions 20 and 22 at a time, greater friction may be obtained by using a plurality of properly spaced recesses 40 and 42 whereby two, three or more recesses in both bracket 24 and arm 26 may be engaged simultaneously by the bulbous portions of the washer.

It will thus be seen that the spring washer 10 permits indexing adjustment of the arm 26, yet the co-operation of the bulbous prong tips and recesses provide enough friction to effectively maintain the desired adjustment, the detent feature is especially valuable in applications where vibration is present as would be the case if an automobile rear view mirror were mounted in arm 26.

The bulbous shape of the prong tips will prevent gorging and scraping surfaces 36 and 38, which is a common fault of many lock and spring washers, and the cantilever construction of the resilient prongs permits many flexures before a failure occurs, thus numerous adjustments may be made without affecting the efficiency of the spring washer. It will be apparent that the joint is not limited to use with a fixed bracket and adjustable support arm but may be used as the connection between any two linking members.

A modification of the spring washer of Fig. 1 is illustrated in Fig. 6 which may be used with indexable joints not utilizing a shouldered pivot post to maintain the spacing between the bracket and arm. As shown in Fig. 6, the washer 10' is provided with a body 12' and a central hole 14'. Prongs 16' extend radially from body 12' and are provided with alternate concave and convex portions 20' and 22' as in the manner of the embodiment of Fig. 1. To eliminate the use of a shouldered pivot pin, yet prevent the washer from being crushed, a series of flanges 44 and 46 are formed about the periphery of hole 14' which engage the bracket 24' and arm 26'. The flanges are formed from the body 12', flanges 44 being bent upwardly, as viewed in Fig. 6, and alternate flanges 46 projecting downward. The flanges 44 and 46 are bent at right angles to the plane of body 12' and are squared at the tips. As will be seen in Fig. 7, the washer 10' is arranged between bracket 24' and arm 26' concentric with and surrounding pivot bolt 28'. As the nut 30' is tightened down on arm 26', the ends of flange 44 will engage surface 38' and flanges 46 will contact surface 36' when the proper spacing between bracket 24' and 26' is achieved, limiting further tightening of the nut. Thus, flanges 44 and 46 act as a spacer preventing excessive pressure being exerted on the washer 10'. The indexing action and operation of bulbous washer portions with the recesses with the embodiment of Figs. 6 and 7 are the same as those of the embodiment of Figs. 1 and 3.

Another embodiment of the invention is shown in Fig. 8 wherein a washer 48 is formed from a body 50. A hole 52 is formed in the center of body 50 and is formed with flanges 54 and 56 which are similar to the flanges of the washer of Fig. 6. Prongs 58 extend radially from body 50 and are formed whereby the ends of the prongs 58 alternately project upwardly as at 60 or downwardly as at 62, at right angles to the plane of the washer body 50. The tips of the prongs are shaped with an arcuate edge for a purpose later described.

The washer 48 is utilized, as shown in Fig. 9, wherein the bracket 64 and arm 66 are pivotally joined by bolt 68. Washer 48 encompasses bolt 68 such that the flange 54 engages arm 66 and flange 56 contacts bracket 64 automatically producing the proper spacing upon the tightening of nut 70. A series of recesses 72 and 74 are formed in arm 66 and bracket 64, respectively, and are adapted to receive portions 60 and 62 of the washer prongs. The recesses 72 and 74 are shaped to conform to the tips of prongs 58 and are straight sided with a concave arcuate bottom so as to permit the prongs to rise out of the recess when the arm 66 is rotated.

It will thus be appreciated that the invention discloses an indexable joint which is economical to manufacture, positive in its action, and long wearing. It will be understood that the disclosed embodiments are used for illustrative purposes only, and that various modifications may be apparent to those skilled in the art without departing from the spirit and scope of the invention.

I claim:

1. An indexable joint comprising a pair of relatively rotatable members connected together by a pivot and having opposing planar surface portions, a spring washer interposed between said members in circumambient relation to said pivot, said washer comprising a substantially circular planar body, a hole within said body concentric thereto, a series of flanges located on the periphery of said hole projecting at right angles to the plane of said body and formed therefrom, said flanges alternately projecting from opposite sides of said washer body, a plurality of prongs formed in the same plane integral with said body and extending radially therefrom, said prongs having end portions bent at right angles to the plane of said body, an arcuate surface formed on the tip of each of said end portions, the end portions of adjacent prongs projecting in opposite direction from and normal to the plane of said body, at least one recess formed in each of said opposing planar surface portions of said members in alignment with said end portions whereby said end portions will engage said recesses maintaining said rotatable members in a given position.

2. A spring washer for use with an indexable joint comprising an annular planar body formed of sheet material, a hole formed in said body concentric thereto, a series of flanges located on the periphery of said hole projecting at right angles to the plane of said body and formed therefrom, said flanges alternately projecting from opposite sides of said washer body, a plurality of prongs formed in the same plane integral with said body and extending radially therefrom, said prongs having end portions bent at right angles to the plane of said body, an arcuate surface formed on the tip of each of said end portions, the end portions of adjacent prongs projecting in opposite directions from and normal to the plane of said body.

3. A spring washer for use with an indexable joint comprising an annular planar body formed of sheet material, a hole in said body concentric thereto, a series of flanges located on the periphery of said hole and projecting at right angles to the plane of said body, said flanges alternately projecting from opposite sides of said body, a plurality of prongs integral with said body and extending radially therefrom in the same plane thereof, said prongs having outer tips deflected from the plane of said body, said tips of adjacent prongs projecting in opposite directions from the plane of said body.

4. An indexable joint comprising a pair of relatively rotatable members connected together by a pivot and having opposed planar surface portions, a spring washer interposed between said opposing planar surface portions in circumambient relation to said pivot, said washer comprising a substantially circular planar body, a hole within said body concentric thereto, a plurality of prongs formed in the same plane integral with said body and extending radially therefrom, said prongs having tips deflected from the plane of said body, said tips of adjacent prongs projecting in opposite directions from the plane of said body, at least one recess formed in each of said opposing planar surface portions of said members in alignment with said tips, whereby said tips will engage said recesses maintaining said rotatable members in a given position and a series of flanges located on the periphery of said hole projecting at right angles to the plane of said body and formed therefrom, said flanges alternately projecting from opposite sides of said washer body and adapted to engage the rotatable members of said joint.

References Cited in the file of this patent

UNITED STATES PATENTS

| 1,537,649 | McGlashan et al. | May 12, 1925 |
| 2,430,606 | Franz | Nov. 11, 1947 |
| 2,486,583 | Walket | Nov. 1, 1949 |
| 2,605,121 | Ensinger | July 29, 1952 |

FOREIGN PATENTS

| 8,172 | Great Britain | Apr. 11, 1911 |